No. 881,235. PATENTED MAR. 10, 1908.
C. T. GIORGI.
GAS IGNITER.
APPLICATION FILED OCT. 5, 1904. RENEWED FEB. 1, 1908.
2 SHEETS—SHEET 1.
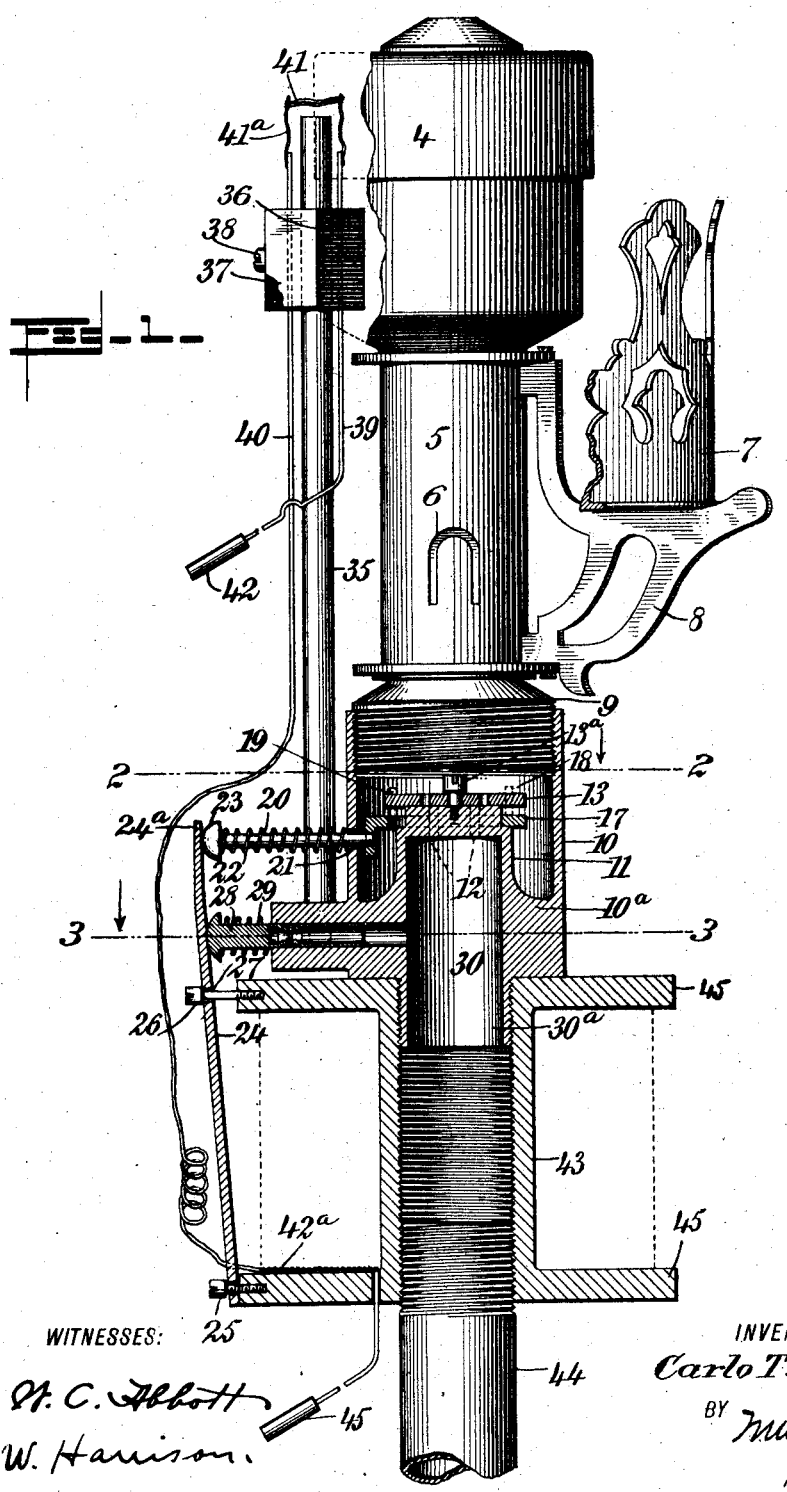
WITNESSES:
W. C. Abbott
W. Harrison
INVENTOR
Carlo T. Giorgi
BY
ATTORNEYS

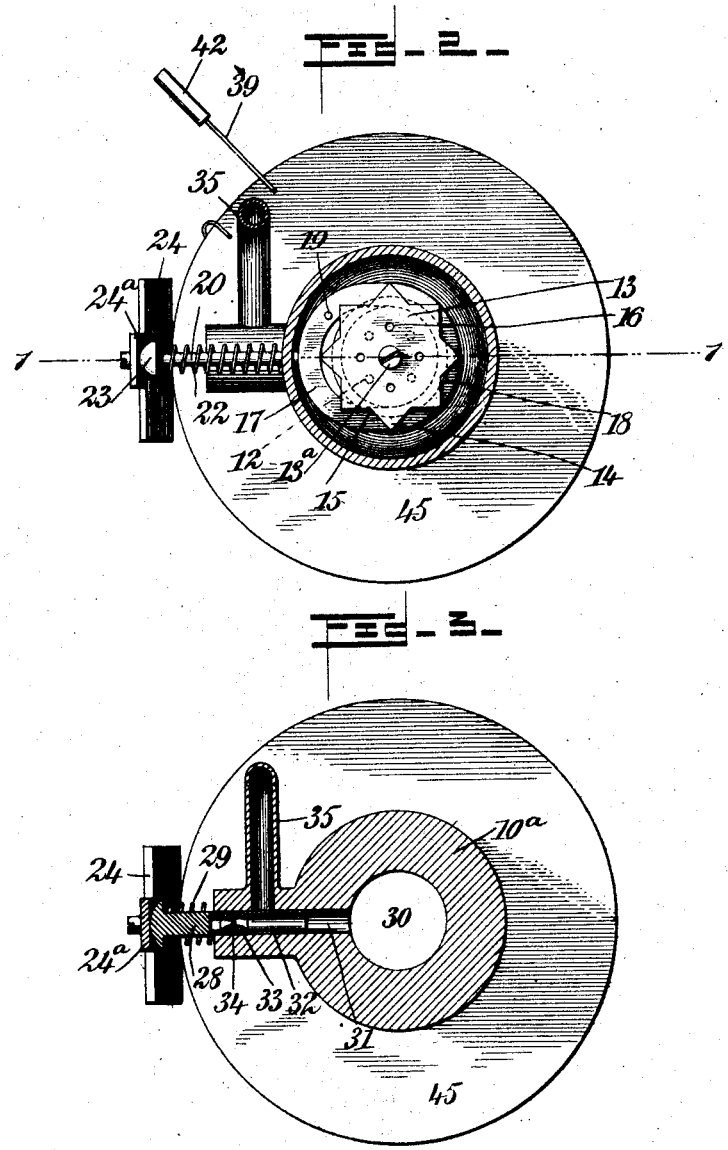

UNITED STATES PATENT OFFICE.

CARLO TOMMASO GIORGI, OF FLORENCE, ITALY.

GAS-IGNITER.

No. 881,235.   Specification of Letters Patent.   Patented March 10, 1908.

Application filed October 5, 1904, Serial No. 227,326. Renewed February 1, 1908. Serial No. 413,842.

*To all whom it may concern:*

Be it known that I, CARLO TOMMASO GIORGI, a subject of the King of Italy, and a resident of Florence, Italy, have invented a new and Improved Gas-Igniter, of which the following is a full, clear, and exact description.

My invention relates to electric igniters and admits of general use, but applies more particularly to gas igniters of the kind used for lighting edifices.

My invention is not limited to the particular construction shown and described, but as outlined by the scope of the appended claims.

Reference is to be had to the accompanying drawings forming a part of this specification, in which similar characters of reference indicate corresponding parts in all the figures.

Figure 1 is a side elevation partly in section showing a gas burner equipped with my invention, substantially on the line 1—1 in Fig. 2; Fig. 2 is a horizontal section through the same upon the line 2—2 of Fig. 1, looking in the direction of the arrow, and showing a part of the valve mechanism; and Fig. 3 is a horizontal section upon the line 3—3 of Fig. 1, looking in the direction of the arrow, showing other parts of the valve mechanism and means for actuating the same.

The burner is shown at 4 and is mounted upon the air tube 5, provided with air inlets 6 and with a shade holder 7 mounted upon brackets 8, which are supported upon the threaded member 9, these parts being of the usual or any desired construction. A tubular member 10 is provided with a comparatively thick base $10^a$ and has a cylindrical valve seat 11 integral therewith. The valve seat is provided with apertures 12 consisting preferably of round holes extending directly through the seat and arranged substantially in the form of a circle, as indicated by dotted lines in Fig. 2.

Mounted upon the valve seat and revoluble relatively thereto, is a valve 13 provided upon its periphery with teeth 14 separated by indentures 15, the valve thus having the general form of a pointed star. A central screw $13^a$ serves as a pivot for the star-shaped valve, as will be understood from Fig. 1. The valve is provided with holes or apertures 16, arranged substantially in the form of a circle and adapted to register with the holes or apertures 12 in the valve seat.

The spacing of the holes in the valve seat and in the valve is such that when the valve is turned a distance representing the distance apart of two consecutive teeth upon its periphery, the holes in the valve seat are brought into or thrown out of registry with those of the valve. The idea is that when the valve is moved a number of successive distances, each representing the distance apart of two consecutive teeth, the holes in the valve seat are first covered and then uncovered, the process being continuous.

A yoke 17 of substantially elliptical shape is provided with pins 18, 19 disposed in the position indicated in Fig. 2. These pins are adapted to engage the teeth 14 of the valve and to turn the same step by step, a movement of the yoke in either of two directions carrying the valve a distance representing the distance apart of two consecutive teeth. A stem 20 is rigidly connected with the yoke 17 for the purpose of actuating the same. This stem passes loosely through a hole 21 in the tubular member 10, in order that the stem 20 and yoke 17 may have proper freedom of movement. A spiral spring 22 loosely encircles the stem 20 and lodges at one of its ends against the tubular member 10, and at its other end against the head 23 rigidly mounted upon the stem. The spring by its tension keeps the yoke 17 normally drawn to its extreme position to the left, according to the view shown in Fig. 1; that is, the head 23 is constantly pressed outward.

A movable armature 24 having preferably the form of a plate is shown as loosely mounted upon a screw 25, and is adapted to press the head 23 inward or toward the center of the burner. This armature is provided with a tongue $24^a$, extending upwardly therefrom and directly engaging the head 23. A guide screw 26 passes loosely through the aperture 27 in the armature 24 and serves to keep the tongue $24^a$ in proper position relatively to the head 23.

Mounted below the stem 20 is a valve plug 28, encircled by a spiral spring 29 slidably fitted into a side passage 31 which opens into the main passage 30. This valve plug is provided with a tubular portion 32, and this tubular portion is constricted at 33 and is provided with a circle of holes 34 in the center of the constricted portion, as will be understood from Fig. 3.

A by-pass 35 communicates with the side passage 31 and extends outwardly and upwardly therefrom. Mounted upon this by-pass is a number of blocks 36, 37 of insulating material, connected together by a screw 38. Conducting wires 39, 40 pass through the blocks of insulating material and are supported thereby out of contact with the by-pass 35. A filament 41 of platinum wire, preferably stranded as indicated, is mounted upon the conductors 39, 40, which are provided with platinum tips $41^a$ for the purpose of engaging the filament or wire. The wire 39 terminates in binding posts 42, $45^a$, and the wire 40 connects with a winding $42^a$. This winding encircles a tubular core 43, and the base $10^a$ of the tubular member 10 is provided with a threaded portion $30^a$ which fits into the upper end of the tubular core 43, the latter being threaded as shown.

The gas pipe is shown at 44, and upon the ends of the tubular core 43, which is of iron, are integrally mounted disks 45 of the same metal. These disks serve as poles, and the winding core and poles together constitute a magnetic member which attracts the armature 24.

The action of my device is as follows: Normally the apertures 12 in the valve seat are covered by the valve 13, for the reason that the apertures 16 of the valve are out of registry with those of the seat. In this condition, no gas can pass from the pipe 44 to the burner 4; nor can any gas pass from the pipe 44 through the tube 35, for the reason that the circle of holes 34 and the constriction 33 are not in alinement with the by-pass 35, as will be noted from Fig. 1. If, now, an electric current be sent through the winding $42^a$, so as to energize the magnet, the armature 24 will be attracted and the tongue $24^a$ will be forced inward or toward the center of the device. The result is that the stem 20 moves the yoke 17, and the valve 13 is turned a distance representing one-half the distance apart of two of its consecutive teeth, so that the holes 16 are brought into registry with the holes 12 of the valve seat. The same movement of the armature presses the valve plug 28 inward and this brings the constriction 33 and circle of holes 34 into such position that gas may pass upward through the by-pass 35. The same current which energizes the winding $42^a$ heats the stranded wire or filament 41 to incandescence, and this causes the ignition of the gas passing upwardly through the by-pass, and the flame thus formed lights the gas passing from the burner 4. The current through the winding $42^a$ being broken, the stem 20 and valve plug 28 spring back to their respective normal positions. The gas is thus cut off from the by-pass, and the stranded wire or filament 41 is no longer heated, yet the gas from the main burner continues to burn. A complete stroke of the armature back to its starting point, that is to say, its movement toward the burner and subsequent restoration by the spring, is necessary to move the valve a proper distance to leave the gas burning in the main burner.

In order to extinguish the light from the main burner, another current is sent through the winding $42^a$ and the armature 24 is again attracted and the valve 13 is again moved, this time in the position indicated by dotted lines in Fig. 2, so that the holes 12 are now covered and the flow of gas is stopped. This represents the condition of the burner at the time when not in use.

The net result is that if a person desires to light the gas, he merely energizes the winding $42^a$ by sending a current through the conductors, and in order to extinguish the light, he again energizes the winding $42^a$, the means for completing and breaking the circuit being old and well known in the art.

Having thus described my invention, I claim as new and desire to secure by Letters Patent:

1. In a gas igniter, the combination of a burner, a valve seat provided with openings for admitting gas thereinto, a valve having the form of a star wheel revolubly mounted upon said valve seat and provided with openings adapted to register with those of said seat, a yoke slidably mounted and encircling said valve seat, pins mounted upon said yoke and adapted to engage said star wheel, and electrically operated mechanism connected with said yoke for actuating the same so as to bring the openings of said valve into and out of registry with the openings of said valve seat.

2. In a gas igniter, the combination of a burner provided with a main valve and with a side passage, a plug valve mounted within said side passage and provided with a constriction and with openings adjacent to said constriction, a by-pass adapted to communicate with said side passage and controllable by said plug valve, magnetic mechanism for pressing said plug valve in one direction, a spring for retracting said plug valve, means for operating said main valve, so as to turn the flow of gas on and off said burner, and means for igniting small quantities of gas passing through said by-pass toward said burner.

3. In a gas igniter, the combination of a burner provided with a main valve seat, said main valve seat having openings therethrough, a main valve revolubly mounted upon said seat and having the form of a star wheel, said main valve being provided with openings adapted to register with those of said seat, a yoke provided with pins for engaging said star wheel, means for actuating said yoke so as to turn said star wheel step by step, magnetic mechanism controllable by an electric current for actuating said yoke, and means for igniting the gas of said burner when said openings of said valve are in registry with the openings of said seat.

4. In a gas igniter, the combination of a burner, a valve seat provided with openings for admitting gas thereinto, a side passage, mechanism connected therewith and provided with a constriction and with openings disposed adjacent to said constriction, a by-pass adapted to communicate with said side passage and controllable by said mechanism having said constriction, and means controllable electrically from a distance for actuating said mechanism so as to open and close said openings adjacent to said constriction.

5. In a gas igniter, the combination of a burner provided with a main valve and with a side passage, a by-pass communicating with said side passage, a hollow member slidably mounted within said side passage and provided with a constriction and with an opening adjacent to said constriction, and magnetic mechanism controllable from a distance for controlling said member for actuating said main valve.

In testimony whereof I have signed my name to this specification in the presence of two subscribing witnesses.

CARLO TOMMASO GIORGI.

Witnesses:
 EUGEN OPPENHEIMER,
 O. E. KAISER.